M. C. CLARK.
MOLD FOR FORMING FOOTWEAR.
APPLICATION FILED JUNE 1, 1909.

962,697.

Patented June 28, 1910.
3 SHEETS—SHEET 1.

WITNESSES
Grace W. Brown
Frank E. Dixon

INVENTOR
Maurice C. Clark
BY Arthur A. Armington
ATTORNEY

M. C. CLARK.
MOLD FOR FORMING FOOTWEAR.
APPLICATION FILED JUNE 1, 1909.

962,697.

Patented June 28, 1910.

3 SHEETS—SHEET 2.

WITNESSES
Grace N. Brown
Frank E. Dyson

INVENTOR
Maurice C. Clark
BY Arthur A. Annington
ATTORNEY

M. C. CLARK.
MOLD FOR FORMING FOOTWEAR.
APPLICATION FILED JUNE 1, 1909.

962,697.

Patented June 28, 1910.
3 SHEETS—SHEET 3.

WITNESSES

INVENTOR
Maurice C. Clark
BY
Arthur A. Armington
ATTORNEY

UNITED STATES PATENT OFFICE.

MAURICE C. CLARK, OF PROVIDENCE, RHODE ISLAND, ASSIGNOR TO MAURICE C. CLARK COMPANY, OF PROVIDENCE, RHODE ISLAND, A CORPORATION OF RHODE ISLAND.

MOLD FOR FORMING FOOTWEAR.

962,697. Specification of Letters Patent. Patented June 28, 1910.

Application filed June 1, 1909. Serial No. 499,575.

*To all whom it may concern:*

Be it known that I, MAURICE C. CLARK, a citizen of the United States, residing at Providence, in the county of Providence and State of Rhode Island, have invented certain new and useful Improvements in Molds for Forming Footwear, of which the following is a specification.

My invention is an improved mold for use in the manufacture of footwear or similar articles of rubber or like material and my improvement consists of providing a mold which will form and vulcanize a plurality of articles at one operation and which can be applied to and operated in connection with an ordinary vertical press such as is generally used in this art.

The invention is fully set forth in the following specification, illustrated by the accompanying drawings, in which:—

Figure 1:
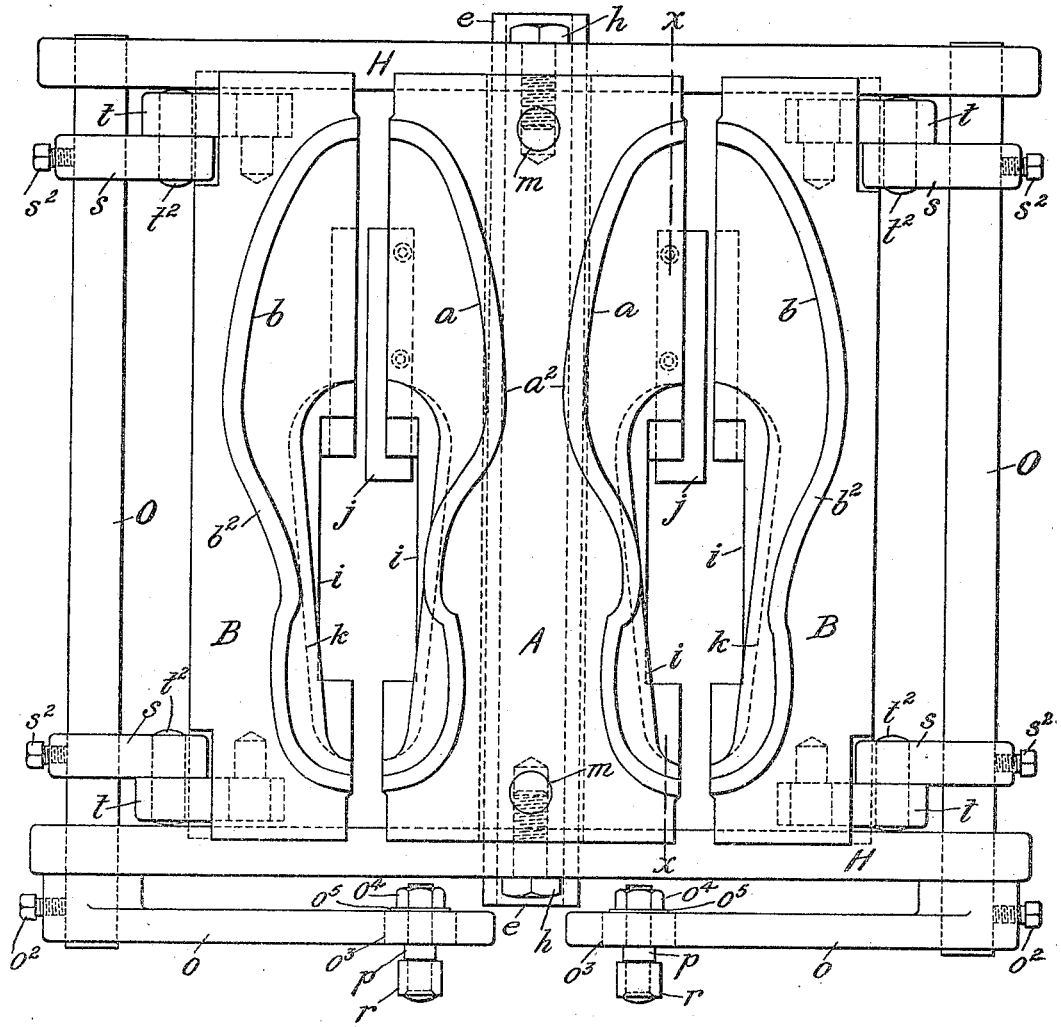
Figure 5:
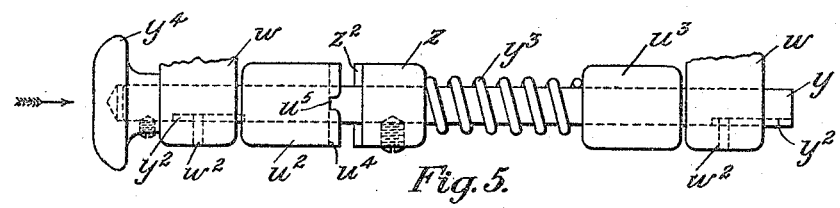
Figure 6:
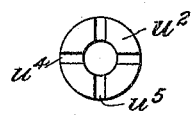
Figure 3:
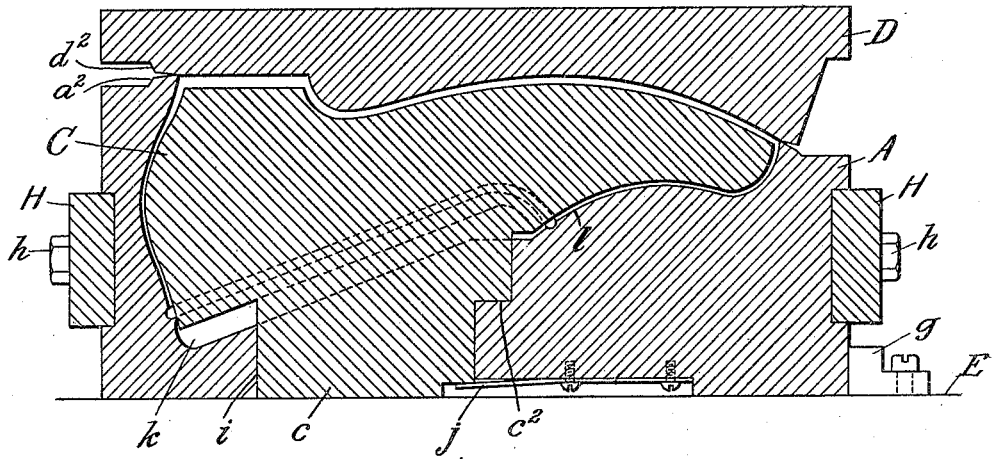
Figure 2:
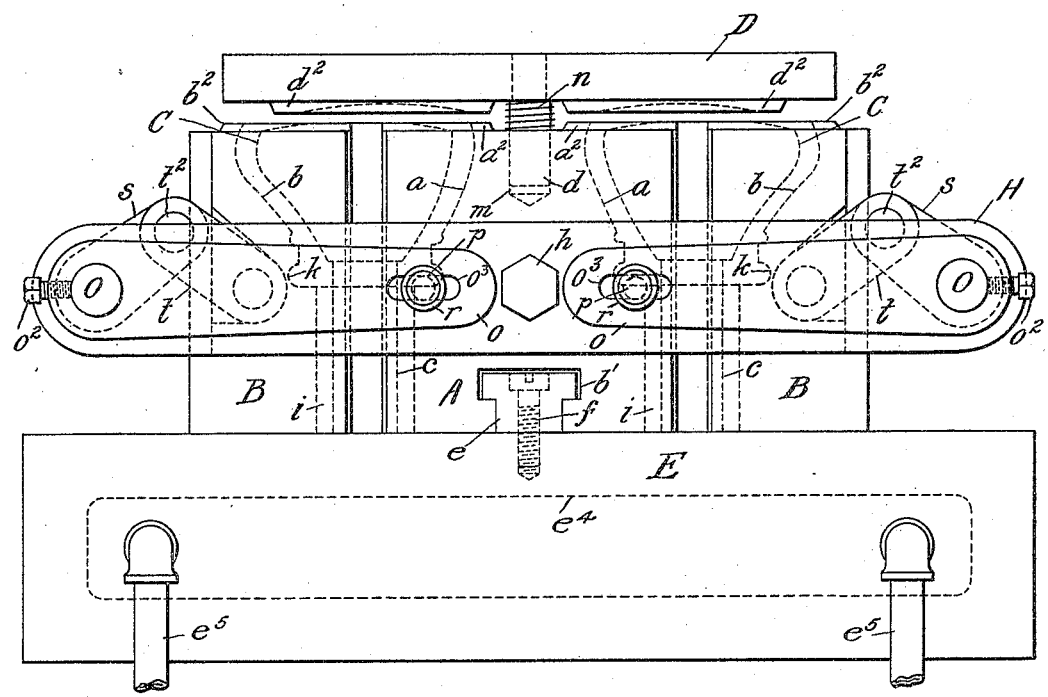
Figure 4:
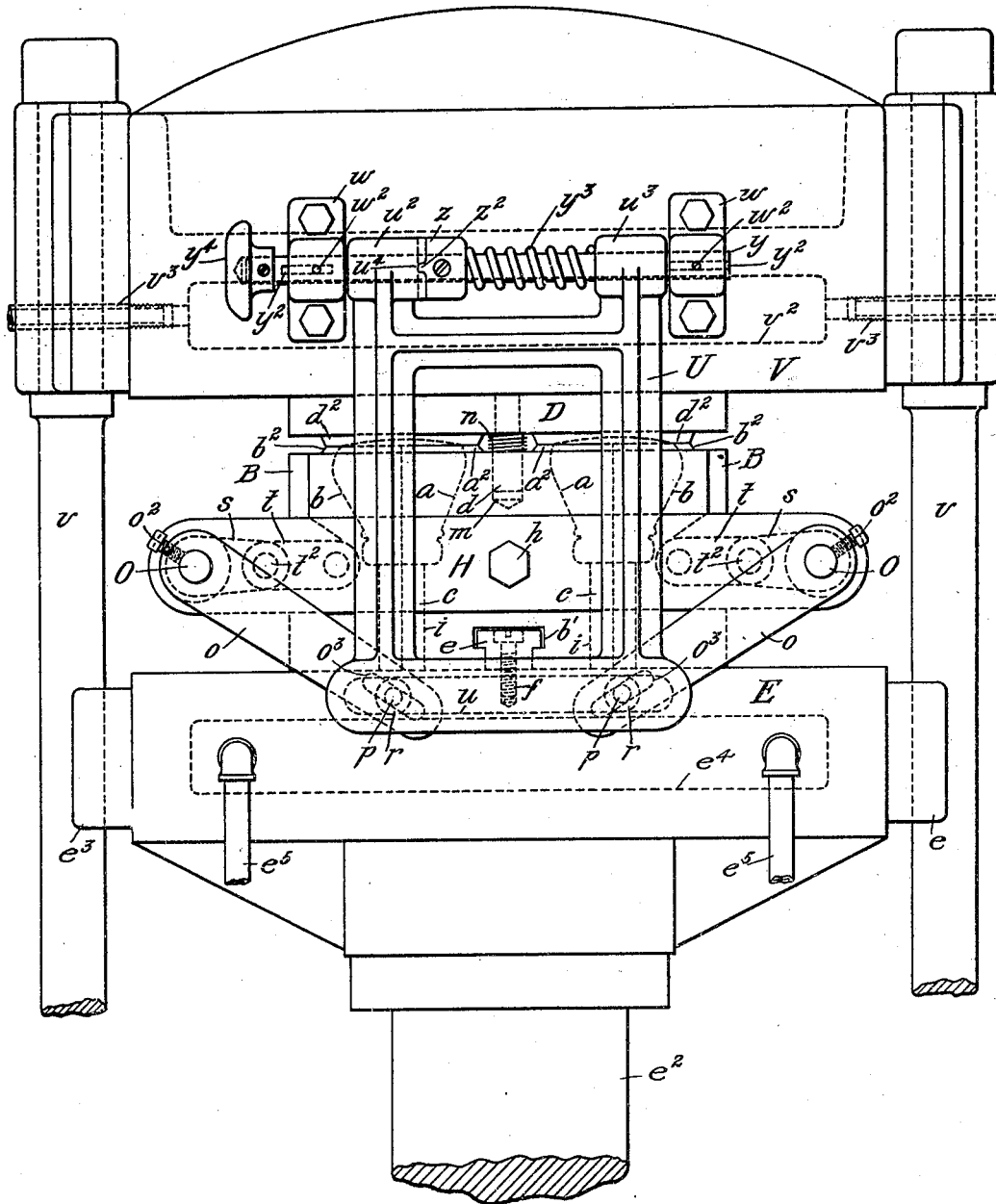

Figure 1 is a plan view of the mold showing the main or body parts open and the top mold plate removed; Fig. 2, an end elevation showing the mold complete with the parts in open position on the steam table or movable platen of a press; Fig. 3, a longitudinal vertical section on the line $x$—$x$ of Fig. 1; Fig. 4, a front elevation of the press showing the mold in position between the upper and lower platens of the press and the parts closed; Figs. 5 and 6, details of the operating mechanism for the mold.

Heretofore, in the process of forming footwear and other similar articles molded from plastic material it has been customary to employ a mold consisting of four parts: a form or work-support on which the material is shaped; two side mold-sections for closing on to the sides of the form; and a top mold-plate for forming the sole of the shoe or bottom of the article. This form of mold requires a special machine or press to operate the parts to close them and is only capable of forming one article at a time.

In the present invention I provide a mold consisting of six parts which can be applied to any usual form of press used in the manufacture of rubber goods and which will form and vulcanize two pieces of rubber footwear or other similar articles made from plastic material at one operation of the press.

In Fig. 1, A is the stationary or main body of the mold having each of its side faces hollowed out or concaved at $a$—$a$ to conform with the outside contour of one side of each of the shoes or other articles to be molded. B—B are movable side mold-sections having concave faces or matrices $b$—$b$ adapted to form the opposite sides of the articles and arranged to slide on the platen of the press to act in conjunction with the stationary mold-body. C—C are removable work-supports on which the articles are shaped, each one adapted to be held between one of the side mold-sections and the stationary mold-body, see Figs. 2 and 3. D is the top-plate or sole mold member made in one piece and having its lower face shaped in this instance to form the soles of two shoes. The work-supports or lasts and the matrices of the mold-sections are here shown as having contours adapted to a conventional form of rubber shoe, but it will be obvious that these parts might be varied in form to adapt them for molding different shapes and sizes of shoes or for forming other similar hollow articles of plastic material such as rubber, papier mâché, etc.

The main body A of the mold is preferably formed with a longitudinal T-slot $b'$ in its base adapted to receive a correspondingly shaped guide-rail $e$ which is secured to the lower platen E of the press by the screws $f$. The body A of the mold may be slid on or off of the platen E and is held laterally by the guide-rail $e$ to take the thrust of the side mold-sections. Secured to the platen E I have shown a stop $g$, see Fig. 3, adapted to abut the rear end of the mold body A to limit its backward movement and locate it centrally on the platen.

The front and rear faces of the body A are longitudinally slotted and in the slots are secured two guide-bars H—H by means of bolts $h$—$h$. The front and rear faces of the side mold-sections B—B are likewise slotted to receive the guide-bars H—H, the latter serving as rails to guide the sliding movement of the side mold-sections and cause them to register with the central part A when moved into juxtaposition, see Fig. 1.

The work-supports C—C, which for convenience will be hereafter referred to as lasts, are formed with extensions $c$, see Fig. 3, which serve as stems to support the lasts in proper position between the parts of the mold. Preferably the stem $c$ is of rectangular form adapted to fit the recessed seats $i$—$i$, etc., on the inner faces of the mold-sections, and in Fig. 3, the stem is shown with a stepped side at $c^2$ which provides a bearing that can be fitted to adjust the last to its proper height in the mold. The end of the stem $c$ bottoms on the face of the platen of the press and at one side I provide a spring $j$ secured in a recess on the under side of the mold part A with its end adapted to exert an upward pressure on the end of the stem $c$. The spring $j$ tends to hold the last from bottoming in its seat when first placed in position, but when the parts of the mold are finally forced together the last will be pushed clear down with the stem fitting snugly in its seat. The object of this arrangement is to provide for sufficient space between the under side of the last and the upper walls of the mold-sections to allow the excess rubber to be squeezed out around the stem $c$.

A channel or vent is provided in the mold-sections at $k$ extending around the stem contiguous with the portion of the last which forms the rim around the opening of the shoe. Into this channel the excess rubber is received as it is forced out from the space around the last in which the walls of the shoe are molded. It will be noticed that this space is narrowest at $l$, see Fig. 3, where the thin upper or vamp of the shoe is formed and the purpose of the spring $j$ is to hold the last slightly raised while the sides of the mold are being carried inward, so that there will be a sufficient space between the last and the mold-sections at $l$ to allow the plastic rubber to flow into the vent channel $k$.

The sole mold-plate D is provided with dowel pins $d$—$d$, see Fig. 2, fitted to corresponding holes $m$—$m$ in the stationary portion A of the mold. Suitable coiled springs $n$ surround the pins between the plate D and body A and serve to keep the plate raised free of the mold-sections while the side mold-sections are being moved into position. The upper faces of the mold-body A and mold-sections B—B and the lower face of the plate D are formed with rims or bosses $a^2$, $b^2$ and $d^2$ surrounding the edges of the mold cavities and meeting in sharp edges on the interior of the mold as shown in Fig. 3. These shear edges serve to trim off the surplus material that is forced or squeezed out of the mold, thus making a smooth finish around the edge of the sole.

The means for operating the side mold-sections B—B to force them up against the central portion A consists of the following instrumentalities: Two rods O—O are supported rotatively in bearings at the ends of the guide-bars H—H. Mounted on the forward ends of the rods O—O are two arms $o$—$o$ secured by any suitable means such, for instance, as the set screws $o$—$o$, etc. At the opposite ends of the arms $o$—$o$ are crank-pins $p$—$p$ carrying rolls $r$—$r$ at their outer ends. The crank-pins $p$—$p$ are formed with reduced portions extending through slots $o^3$—$o^3$ in the ends of the arms $o$—$o$ and threaded to receive the nuts $o^4$—$o^4$ which bear on suitable washers $o^5$—$o^5$. This provides for the adjustment of the crank-pins longitudinally of the arms so that the operative length of the latter may be varied. The crank-pins are secured in position by tightening the nuts $o^4$—$o^4$ to bind the arms $o$—$o$ between the shoulders on the pins and the washers $o^5$—$o^5$, see Fig. 1. Mounted on the rods O—O between the ends of the guide-bars H—H are four levers $s$—$s$—$s$—$s$ secured to the rods by means of the set-screws $s^2$—$s^2$, etc. Hinged at the outer ends of the mold sections B—B are four links $t$—$t$—$t$—$t$ which are pivotally connected to the ends of the levers $s$—$s$, etc., by means of the studs $t^2$—$t^2$, etc. The levers $s$—$s$ etc. and links $t$—$t$, etc., form toggle connections which are operated by the turning of the rods O—O, through the crank-arms $o$—$o$, to move the mold sections B—B toward or away from the stationary part A. When the arms $o$—$o$ are raised, as shown in Fig. 2, the levers $s$—$s$, etc. will be raised to withdraw the side mold-sections B—B from contact with the stationary mold section A; when the arms $o$—$o$ are depressed, as illustrated in Fig. 4, the levers $s$—$s$, etc., will be rocked downward to force the side mold-sections up against the center mold-body A. The toggle connections $s$ and $t$, etc., are so proportioned that when the studs $t^2$—$t^2$, etc., are carried down on the dead center with the pivots of the levers $s$—$s$, etc., and links $t$—$t$, etc., the thrust of the arms $o$—$o$ will cause a "squeeze" of the mold-sections B—B against the material on the lasts C—C and the sections of the mold will be forced tightly together at their abutting faces.

The means for operating the crank arms $o$—$o$ consists of a bracket or frame U fastened to the upper platen of the press and provided with a horizontal groove $u$ at its lower end with which the rolls $r$—$r$ engage.

In Fig. 4 I have shown a usual form of vertical press having an upper platen V rigidly supported at the top of four upright columns $v$—$v$, etc., and a movable platen E, before referred to, operated by a plunger $e^2$ and guided by suitable ways $e^3$—$e^3$, etc., which slide on the columns $v$—$v$. Both platens are of hollow form having steam chambers, the one in the upper platen indicated at $v^2$ and provided with suitable intake and exhaust pipes $v^3$—$v^3$ for the circulation of live steam. The platen E has a similar chamber $e^4$ with supply and exhaust pipes $e^5$—$e^5$ which have suitable flexible connections, not here shown, with the source of the steam.

The frame U is preferably hinged to the top platen V so that it may be swung out and away from the front of the platen E to permit the removal of the mold from the press, and also to make the parts more accessible to the operator for placing and removing the lasts. Two brackets $w$—$w$, fastened to the front face of the platen V, have bearings for a rod $y$ which is slidable in the bearings, but held from turning by pins $w^2$—$w^2$ engaging grooves $y^2$—$y^2$ in the rod, see Figs. 4 and 5. The frame U is supported by bearings $u^2$ and $u^3$ surrounding the rod $y$ and held laterally between the brackets $w$—$w$. The inner face of the bearing $u^2$ is grooved radially with the grooves $u^4$ and $u^5$ disposed at right angles to each other, see Fig. 6. Secured to the rod $y$ between the bearings $u^2$ and $u^3$ is a collar $z$ having a tongue or spline $z^2$ formed on the face opposed to the grooves $u^4$ and $u^5$. The spline $z^2$ is adapted to engage either one or the other of the grooves in the bearing $u^2$ to hold the frame U from turning on the rod. A coiled spring $y^3$ encircling the rod $y$ between the collar $z$ and bearing $u^3$ serves to move the rod bodily in the direction of its axis to carry the spline $z^2$ into engagement with the slots in the bearing $u^2$. A knob $y^4$ secured to the end of the rod $y$ serves as a convenient means for pressing the rod in the direction indicated by the arrow, Fig. 5, to release the collar $z$ from engagement with the bearing $u^2$ so that the frame U may be swung on the rod for the purpose heretofore described.

It will be observed that when the frame U is in operative position as shown in Fig. 4, the spline $z^2$ on the collar $z$ engages the groove $u^4$ and the frame is held rigidly in its vertical position. When the operator wishes to get at the mold in the press he presses on the knob $y^4$ to release the collar $z$ from engagement with the bearing $u^2$. The frame U is then swung outward and upward until the slot $u^5$ in the bearing $u^2$ comes opposite the spline $z^2$ which lies in a horizontal plane. The spring $y^3$ pressing against the collar $z$ will then move the latter to carry its spline into engagement with the slot $u^5$ and this engagement serves to hold the frame U in a horizontal position out of the way of the operator while he is manipulating the various parts of the mold.

Having now set forth my device in detail I will next describe its operation when used in the process of manufacturing rubber shoes: Assuming the frame U to be upheld by the arrangement just described in its horizontal position, the three sections of the mold are first placed on the platen E with the main or central portion A held by the T-rail $e$. The arms $o$—$o$ are then raised to a horizontal position to open the mold as shown in Figs. 1 and 2 to receive the lasts C—C. The operator prepares the lasts for the mold by placing the previously cut lining sections of fabric in position and covering the whole with rubber in a plastic state. After both lasts have been thus prepared they are placed in the mold with their stems $c$—$c$ resting in the seats $i$—$i$, etc. and held slightly raised from their final positions by the springs $j$—$j$. The top plate D is then placed over the mold sections with its dowel pins $d$—$d$ locating it in proper position and the springs $n$—$n$ holding it raised from the main body of the mold, see Fig. 2. The frame U is next lowered to its vertical position where it will be automatically locked in place by the action of the sliding rod $y$ and collar $z$. The platen E is now in a lowered position, so posed as to bring the rolls $r$—$r$ opposite the slot $u$ in the frame U with which they engage. When power is applied to the press the plunger $e^2$ will move upward carrying the platen E up and with it the whole mold. As the platen E moves upward in relation to the frame U the arms $o$—$o$ are rocked downward, through the engagement of the rolls $r$—$r$ with the groove $u$, the rolls moving away from each other in the groove. This causes the side mold sections B—B to move inward under the thrust of their toggle connections operated by the rods O—O, and as the side mold sections move toward the center mold-body A the top plate D comes into contact with the upper platen V of the press and is pressed down on to the top of the main mold sections. This last action seats the lasts C—C firmly in their final positions to give the proper space between the lasts and the molds for the forming of the walls of the shoes. The adjustment of the rolls $r$—$r$ on the arms $o$—$o$ provides for timing the action of the side molds with the movement of the platen E so that all parts of the mold are brought together at the same instant. The squeezing of the mold sections together causes the plastic material to be pressed into shape around the lasts and any excess of material as originally applied to the last is forced out around the edges of the soles and around the openings in the tops of the shoes, and the shear edges around these parts of the mold trim off the surplus rubber as before described. After the mold has been closed, live steam is admitted to the chambers in the platens E and V causing them to heat the several sections of the mold and vulcanize the shoes held therein. After the shoes have been properly vulcanized the mold is cooled and can be opened by simply reversing the movement of the platen E. As the platen E descends the engagement of the rolls $r$—$r$ with the frame U causes the arms $o$—$o$ to be raised and this in turn rocks the rods O—O to draw away the side mold sections B—B. After the side mold sections have been drawn away from the center mold-body A the frame U is swung out of the way and the top-plate D lifted off. The lasts C—C can then be removed from their seats and the shoes taken off. It will be seen that my invention provides for forming and vulcanizing a pair of shoes or similar articles at one operation, thus doubling the output of the press and its attendant; and further, the device can be attached to an ordinary press without any material alteration of the latter, so that it is possible to equip a plant for manufacturing footwear and other similar articles without displacing the machinery before employed.

I am aware that molds with lasts and movable side sections and top plates have before been used in the art, but my invention is distinguished from previous devices of this sort from the fact that it consists of a stationary central section and movable side sections so arranged in relation to each other that two articles instead of one are molded at each operation; and the device shows further meritorious improvement in that it does not require a specially-designed machine to operate it, but can be used as an attachment to the usual form of press.

It will be evident that various modifications might be made in the form and arrangement of the device without departing from the scope of the invention.

Therefore, without limiting myself to the exact construction shown, what I claim is:—

1. In a mold for forming a plurality of hollow articles from plastic material at one operation, the combination with a stationary mold-body, of two side mold-sections adapted to be moved into contact with the central mold-body, the central mold-body and the side mold-sections formed with opposed seats, a top mold-plate arranged to cover the several sections of the mold, work-supports having stems fitted to the seats in the mold-body and mold-sections and arranged to be held with a space between them and the top mold-plate when the latter is in position, and means to bring the sections of the mold together.

2. The combination in a mold for forming footwear of a central, stationary mold-body having a matrix on each of its two opposite sides, side mold-sections adapted to abut the sides of the central mold-body and formed with matrices registering with those of the central mold-body, and lasts shaped to conform to the hollow of the matrices, said lasts formed with means for engaging the mold-body and side mold-sections to support the lasts in a raised position between the several parts of the mold.

3. The combination of a central, stationary mold-body, guide-bars extending laterally therefrom, side mold-sections adapted to slide on the guide-bars, rockable rods supported at the ends of the guide-bars, means to rock the rods, and connections between the rods and the side mold-sections to move the latter toward and away from the central mold-body when the rods are rocked.

4. The combination of a central, stationary mold-body, guide-bars extending laterally therefrom, side mold-sections adapted to slide on the guide-bars, rockable rods supported in bearings in the guide-bars, levers on said rods, links connecting the levers with the side mold-sections, and arms for rocking the rods to move the levers to slide the side mold-sections in and out of contact with the central mold-body.

5. The combination of a central, stationary mold-body, slidable side mold sections adapted to be moved toward and away from the central mold-body, two rockable rods supported in bearings adjacent the side mold sections, an arm on each rod to rock the latter, and toggle connections between the rods and the side mold sections adapted to thrust the side mold sections against the central mold-body when the rods are rocked by the arms.

6. The combination of a central, stationary mold-body, slidable side mold sections adapted to be moved toward and away from the central mold-body, rockable rods supported in fixed bearings adjacent the side mold sections, toggle connections between the rods and the side mold sections, arms on the rods and means to move the arms in synchrony to operate the side mold sections.

7. The combination of a central, stationary mold-body, slidable side mold sections adapted to be moved toward and away from the central mold-body, rockable rods supported in fixed bearings adjacent the side mold sections, toggle connections between the rods and the side mold sections, arms on the rods, crank pins adjustable longitudinally on the arms and means to engage the crank pins to move the arms and rock the rods to operate the side mold sections.

8. The combination of a central, stationary mold-body, side mold sections adapted to be moved into contact with the sides of the central mold-body, links connected to the side mold sections, rockable levers connected with the links, crank arms arranged to rock the levers, crank pins on the arms, rolls on said pins and a frame formed with a groove adapted to engage the rolls to operate the crank arms.

9. In a mold for forming a plurality of hollow articles from plastic material at one operation, the combination of a central, stationary mold body A, two side mold-sections B—B adapted to be moved into contact with the sides of the central body, work-supports C—C supported between the central body and side sections, a top mold-plate D adapted to engage the upper faces of the body and side sections, toggle connections to move the side sections to and from the mold body, and crank-arms to operate the toggle connections.

10. In a mold for forming a plurality of hollow articles from plastic material at one operation, the combination with a stationary mold-body A, of side mold-sections B—B movable into contact with the sides of the body A, forms C—C supported between the mold-body and the side-sections, means to guide the movable side-sections to register with the mold-body, a removable top mold-plate D, and means to guide the top-plate to register with the body and side-sections.

11. In a mold for forming a plurality of hollow articles from plastic material at one operation, the combination with a stationary mold-body A, of side mold-sections B—B movable into contact with the sides of the body A, the mold-body and side-sections formed with seats in their abutting faces, work-supports C—C having stems $c$—$c$ adapted to fit the seats in the body and side-sections, a top mold-plate D adapted to cover the several mold-sections, and dowel pins $d$—$d$ to guide the top-plate into proper register with the other sections of the mold.

12. In a mold for forming a plurality of hollow articles from plastic material at one operation, the combination of a stationary mold-body A, side mold-sections B—B movable into contact with the sides of the body A, the body and side-sections formed with seats in their opposed faces, work-supports C—C having supporting stems $c$—$c$ fitted to the seats in the body and side-sections, springs adapted to engage the stems to hold the work-supports in a raised position in their seats, a top mold-plate D, means to guide said top-plate to register with the body and side-sections and springs to hold the top-plate raised from said sections.

13. In a mold for forming a plurality of hollow articles from plastic material at one operation, the combination of a fixed mold-body A, side mold-sections movable to contact with the sides of the body A, horizontal guide-bars H—H fastened to the ends of the body A and engaging grooves in the ends of the side-sections, work-supports C—C having stems fitted to seats in the body and side-sections, toggle connections hinged on the guide-bars and connected with the side-sections, means to operate the toggles to close the side-sections against the mold-body, and a top mold-plate adapted to close on to the top of the body and side-sections.

14. The combination with a vertical press having a fixed upper platen V and a movable lower platen E, of a mold for forming a plurality of articles at one operation of the press, comprising a central mold-body A adapted to be secured to the platen E, side mold-sections B—B slidable on the platen E to contact with the sides of the body A, and means operated by the movement of the platen E to slide the side-sections into and out of engagement with the central mold-body.

15. The combination with the upper fixed platen and the lower movable platen of a vertical press, of a mold for forming a plurality of articles at one operation of the press, comprising a central mold-body adapted to be secured to the lower platen, side mold-sections slidable on the lower platen to contact with opposite sides of the mold-body, means operated by the raising of the movable platen to close the side sections against the central body, and a top mold-plate adapted to be engaged by the upper platen to close down on the top of the mold.

16. The combination with the fixed and movable platens of a press, of a mold comprising a central body fixed on the movable platen, two side mold-sections slidable on the movable platen, a top mold-plate adapted to be engaged by the fixed platen to force it against the main part of the mold, and means on the fixed platen operating to carry the side-sections into contact with the central body of the mold synchronously with the closing of the top-plate.

17. The combination with the upper and lower platens of a press, of a mold comprising a central body-portion fixed to the lower platen, side mold-sections slidable on the lower platen to engage the sides of the central body, lasts held between the body and side-sections, toggle connections arranged to close the side-sections against the central body, and means on the upper platen to operate the toggles when the lower platen is raised toward the upper platen.

18. The combination with the upper and lower platens of a press, of a mold comprising a fixed body, side-sections slidable on the lower platen to close against said body, lasts held between the body and the side-sections, a top-plate adapted to close the top of the mold, links connected with the side-sections, rockable levers connected with the links, arms for rocking the levers, and a frame supported in fixed relation to the upper platen and adapted to engage the arms to operate the side-sections synchronously with the movement of the lower platen.

19. The combination with the upper and lower platens of a press, of a mold comprising a central body portion fixed on the lower platen, side-sections slidable on the lower platen to close against said body, toggle connections arranged to move the side-sections, arms to operate said toggle connections, crank pins on said arms, rolls on said pins, and a frame hinged to the upper platen to adapt it to be swung out away from the mold and formed with a groove adapted to engage the rolls on the crank pins when the frame is in its vertical position.

20. The combination with the upper and lower platens of a press, of a mold comprising a central body portion fixed on the lower platen, side sections movable to close against the body portion, toggle connections to operate the side sections, arms to actuate the same, a frame hinged on the upper platen to swing outward and upward, and adapted to engage the arms when in a vertical position, and means to automatically lock the frame in either its vertical or horizontal position.

21. The combination with the upper and lower platens of a press, of a mold comprising sections movable on the lower platen to close together, means to operate the sections, a frame to engage said means, a rod supported on the upper platen and serving as a hinge for the frame, and means on the rod to automatically engage the frame to hold it either vertical or in a raised position.

22. The combination with the upper and lower platens of a press, of a sectional mold on the lower platen, means to operate the sections, a frame to engage said means, a rod slidable in brackets on the upper platen and extending through bearings in the frame, a collar on said rod adapted to engage with one of the bearings of the frame, and a spring to slide the rod to carry the collar into engagement with the bearing to lock the frame in position.

In testimony whereof I affix my signature in presence of two witnesses.

MAURICE C. CLARK.

Witnesses:
GEORGE W. BUNGE,
LUCY BAUMAN.